United States Patent
Spitzer et al.

(10) Patent No.: US 8,444,743 B2
(45) Date of Patent: May 21, 2013

(54) METHOD FOR PRODUCING A STEEL MELT CONTAINING UP TO 30% MANGANESE

(75) Inventors: Karl-Heinz Spitzer, Clausthal-Zellerfeld (DE); Christian Redeker, Hannover (DE)

(73) Assignees: Salzgitter Flachstahl GmbH, Salzgitter (DE); Peiner Träger GmbH, Peine (DE)

( * ) Notice: Subject to any disclaimer, the term of this patent is extended or adjusted under 35 U.S.C. 154(b) by 23 days.

(21) Appl. No.: 12/747,950

(22) PCT Filed: Nov. 17, 2008

(86) PCT No.: PCT/DE2008/001926
§ 371 (c)(1),
(2), (4) Date: Dec. 20, 2010

(87) PCT Pub. No.: WO2009/076923
PCT Pub. Date: Jun. 25, 2009

(65) Prior Publication Data
US 2011/0094336 A1    Apr. 28, 2011

(30) Foreign Application Priority Data
Dec. 14, 2007   (DE) .......................... 10 2007 061 062

(51) Int. Cl.
*C21C 7/076*    (2006.01)
(52) U.S. Cl.
USPC ........................................ 75/10.16; 75/10.46
(58) Field of Classification Search
USPC .............. 75/570, 567, 569, 571, 10.46, 10.61
See application file for complete search history.

(56) References Cited

U.S. PATENT DOCUMENTS

| 2,076,885 | A |   | 4/1937 | Feild |
|-----------|---|---|--------|-------|
| 2,806,778 | A | * | 9/1957 | Crafts .............................. 149/41 |
| 4,222,768 | A | * | 9/1980 | Suyama ....................... 75/10.52 |
| 4,919,714 | A | * | 4/1990 | Sugiura et al. .................. 75/529 |

FOREIGN PATENT DOCUMENTS

| AT | 502 312 A1 | 2/2007 |
| DE | 35 02 542 A1 | 7/1986 |
| DE | 10164610 C1 | 7/2003 |
| EP | 0 889 144 A1 | 1/1999 |
| JP | 2003253316 A * | 9/2003 |
| RU | 2 096 491 C1 | 11/1997 |
| RU | 2 208 052 c1 | 7/2003 |

OTHER PUBLICATIONS

Machine translation of JP 2003-253316 A, published Sep. 2003.*
Tolstoguzov et al.: Direct alloying of steel with manganese in EAF, in: STAL, Metallurgia, Moscow, Russia, No. 1, Jan. 1, 1995, pp. 24-27.
Bolbrinker: "Stahlfibel" in: Verein Deutscher Eisenhüttenleute, Düsseldorf, 1989, pp. 56-60.

* cited by examiner

*Primary Examiner* — George Wyszomierski
*Assistant Examiner* — Tima M McGuthry Banks
(74) *Attorney, Agent, or Firm* — Henry M. Feiereisen LLC

(57) ABSTRACT

The invention relates to a method for producing a steel melt containing up to 30% of Mn, which additionally may comprise up to 5% Si, up to 1.5% C, up to 22% Al, up to 25% Cr, up to 30% Ni, and up to 5% each of Ti, V, NB, Cu, Sn, Zr, Mo, and W, and up to 1% each of N and P, with the remainder being iron and unavoidable steel companion elements.

18 Claims, No Drawings

METHOD FOR PRODUCING A STEEL MELT CONTAINING UP TO 30% MANGANESE

CROSS-REFERENCES TO RELATED APPLICATIONS

This application is the U.S. National Stage of International Application No. PCT/DE2008/001926, filed Nov. 17, 2008, which designated the United States and has been published as International Publication No. WO 2009/076923 and which claims the priority of German Patent Application, Serial No. 10 2007 061 062.0, filed Dec. 14, 2007, pursuant to 35 U.S.C. 119(a)-(d).

BACKGROUND OF THE INVENTION

The invention relates to a method for producing a steel melt containing up to 30% manganese.

In this context steel melts are considered which may contain, in addition to Mn, up to 1.5% C, up to 22% Al, up to 25% Cr, up to 30% Ni, as well as up to 5% of each of Ti, V, Nb, Cu, Sn, Zr, Mo and W, as well as up to 1% of each of N and P.

Such steels are used, for example, in the automotive industry in order to meet the requirement for reducing the fleet fuel consumption while maintaining the highest comfort level. Weight reduction plays a crucial role. The supplier tries to meet this desire, in particular in the automobile body segment, by attempting to reduce the wall thickness through the use of higher-strength steels, without suffering losses in the buckling resistance, in the shaping process by deep drawing and/or stretch drawing, and in the coating process.

EP 0 889 144 A1 proposes a cold-formable, in particularly readily deep-drawable austenitic lightweight steel with a tensile strength of to 1100 MPa. The major elements of this steel are Si, Al and Mn in a range of 1 to 6% Si, 1 to 8% Al, and 10 to 30% Mn, with balance iron, including usual steel-accompanying elements.

The attainable high deformability is attained through particular effects, for example TRIP (Transformation Included Plasticity), TWIP (Twinning Included Plasticity) or SID (Shearband Included Plasticity) properties of the steel.

The problem with these steels is their metallurgical production due to the high contents of alloying elements.

DE 101 64 610 C1 disclose a method for producing a steel melt containing up to 30% manganese, wherein the charge material is melted into a melt, for example, in an induction furnace, wherein the charge melt is deoxidized with aluminum such that the oxygen is bound during the entire melting process by the aluminum, and manganese and silicon are added to the deoxidized melt, and the temperature of the molten bath is maintained slightly above the liquidus temperature. This approach is intended to prevent the creation of brown smoke when manganese is added to the melt.

DE 35 02 542.5 discloses a production method for a steel with no less than 8 wt.-% Mn, wherein an electric arc furnace with a basic lining is loaded with a charge and a slag-forming flux, which are thereafter melted.

An important slag-former is limestone, whereby a diffusion oxidation is performed before manganese is added to the melt. The manganese, as well as the slag mixture made of $Al_2O_3$, limestone, a carbon-containing material, iron silicide and calcium fluoride, are hereby added to the melt in small portions. The final deoxidation is performed with aluminum.

This process route is intended to reduce, on one hand, the phosphorus content in the melt and, on the other hand, the total content of manganese(II)-oxide and iron(II)-oxide in the refining slag. This process is particularly suitable to lower a high phosphorus content in the melt.

The conventional manufacturing approaches for producing steels with a high manganese content have fundamental disadvantages.

The high alloy contents require supply of additional heat to the melt during the addition of the charges that include the alloy elements; alloying, which is typically performed in a pan furnace, is very time-consuming due to the vessel geometry and the associated small heating power, and is therefore uneconomical.

In addition, alloying in the pan furnace is difficult, disadvantageous and uneconomical due to the large quantities of charges and slag-formers to be loaded and the associated small bath height or the low pan fill level at the beginning of the treatment.

Another problem is that large portions of the manganese contained in the charges can be absorbed by a rather acidic or oxygen-rich slag and are then no longer available to produce the melt.

The small manganese yield, meaning the quotient between the manganese contained in the melt and the manganese employed in the charges, additionally diminishes the cost-effectiveness.

Conversely, if a basic slag were selected, then foaming of the slag during addition of carbon to the melt would be insufficient.

The widespread practice of slag foaming in arc furnaces occurs as a result of the formation of $CO/CO_2$ from the reaction of the added carbon with FeO from the slag. However, the quantity of FeO present in the basic slag is insufficient, because FeO is very efficiently reduced, for example by silicon from the melt. Formation of a foamed slag, however, increases the energy efficiency and prevents damage to the furnace lining.

In addition, the substances contained in the employed manganese carriers can cause the slag viscosity to increase during the alloying process and may even cause solidification of the slag.

The slag may also cause serious damage to the lining/refractory material, so that the slag path and the refractory material must be matched to one another.

SUMMARY OF THE INVENTION

It is an object of the invention to provide a method for producing a steel melt containing up to 30% manganese, which obviates the aforementioned disadvantages and enables the highest possible cost-effectiveness of the production route.

According to the teachings of the invention, the object is solved by a method of the invention, which includes the steps:
  providing and using a heatable vessel, which is suitable to introduce within a short time large quantities of heat into a melt or into the materials to be melted, with a specific heating power of more than 200 kW per ton of produced melt or a Biot-number smaller than three;
  charging the heatable vessel with a liquid iron melt or with substitute materials carrying solid iron or with a combination of liquid iron melt and substitute materials carrying solid iron;
  addition of a portion or of the total quantity of the basic slag formers consisting essentially of CaO, MgO or corresponding dolomites, wherein the composition and quantity of the slag formers is defined based on the required Si content and the Si/Mn ratio;

thereafter, optional melting of the solid iron carriers to a low-alloyed steel melt with a slag;

addition of a portion or the total quantity of alloy element carriers containing Mn and/or Si;

subsequently optional addition of additional alloy element carriers;

heating and melting the alloy element carriers after or during charging, optionally together with the iron carriers in the charge and the slag formers, or in the melt of the previously melted components;

optional addition of the remaining fraction of slag formers and alloy element carriers;

optional reduction of the produced slag quantity through addition of low-carbon SiMn or SiFeMn with reduced silicon content and smaller fractions of accompanying elements;

addition of silicon-containing charge materials in combination with manganese ore or combined iron/manganese ores, optionally through simultaneous charging or through addition of the silicon-containing charge materials with concurrent or subsequent heating and subsequent addition of the manganese ore or combined iron/manganese ores;

adjusting the slag viscosity through addition of flux agents containing, for example, $Al_2O_3$, $SiO_2$ or $CaF_2$;

final removal of the slag and alloying with aluminum to the desired Al content.

BRIEF DESCRIPTION OF THE DRAWING

NONE

DETAILED DESCRIPTION OF PREFERRED EMBODIMENTS

The method of the invention has the significant advantage that even steels with high manganese content can be melted very economically with only a few process steps.

Through melting in a vessel with a high specific heating power of more than 200 kW per ton of reduced melt, or a Biot-number of less than three, very short processing times are realized, resulting in a very cost-effective method.

The process route of the invention is designed so that the entire bandwidth of chemical compositions, 80, steels with, for example, up to 30% manganese, can be produced with maximally only two vessels.

Furnaces with a high mass-specific power input and good heat transfer into the material to be melted, for example electric arc furnaces, are used for melting.

The transfer into the material to be melted is characterized by the Biot-number. This dimensionless parameter is a measure for the ratio of outer heat transfer, i.e., heat transport from the heated boundary surface of the melt to the inner heat transfer, meaning heat conduction into the melt. It is computed from the coefficient of the product of heat transfer coefficient at the heat-transferring boundary surface and the characteristic length for thermal conductivity. For an arc furnace or a pan furnace, the characteristic length is, for example, the depth of the bath.

The manganese yield is significantly increased by a purposely matched selection of charges and slag formers, i.e., the slag absorbs significantly less manganese and more manganese remains in the melt, which further increases the cost-effectiveness of the method.

The intentional adjustment of the slag viscosity during melting through the addition of flux materials, such as $Al_2O_3$, $SiO_2$, and optionally also $CaF_2$, advantageously counteracts a possible lowering of the viscosity until the melt solidifies.

According to the process route of the invention, the production either starts with a melt of >95% iron, for example from scrap metal melted in the same vessel or in a different vessel and/or with direct-reduced iron (DRI), FeMn ores, while iron or crude steel from the blast furnace and optional converter or by concurrent melting of iron-containing charges, such as scrap metal, DRI and a portion or the total quantity of the charges used during melting for alloying or slag formers.

The desired molten bath temperature is subsequently adjusted by heating (addition of heat) and maintained slightly above the liquidus temperature of the alloy composition which varies as a function of time by way of a temperature control, and/or the slag temperature is maintained in a range where foaming of the slag and a high mass transfer with the melt can be attained, particularly through adjustment of a suitable viscosity.

Sufficient foaming of the slag can still be attained by addition of $CaCO_3$ in spite of the use of a basic slag. $CaCO_3$ also supplies the CaO required for slag formation during its reaction to $CaO+CO_2$. Alternatively, $Ca(OH)_2$ can be used which forms CaO and $H_2O$ vapor.

According to the invention, the alloying elements may be added by deposition onto the slag, by blowing with a lance, or by uncoiling filler wire.

Alternatively, the alloying elements may also be added in form of pellets or by supplying pourable material from, for example, containers, barrels, hoppers, etc.

Advantageously, wear of the refractory material lining of the furnace can be reduced through addition of MgO or MgO-dolomite.

According to the invention, the Si-content and the ratio Si/Mn can be adjusted by adjusting the slag composition and the quantity of slag formers which increase the basicity, in particular through addition of CaO, dolomite, MgO and the like.

The Si/Mn ratio in the melt essentially determines the basicity of the slag. If little lime is used, then the basicity is caused by the MnO absorbed by the slag. If a substantial quantity of lime is added, correspondingly less MnO is absorbed, so that oxidation is improved through formation of $SiO_2$ and the oxygen activity of the system decreases. Optionally, vacuum decarburization can advantageously be performed under a low CaO content.

To keep the quantity of slag low and processing time in the employed vessel short, a specially produced manganese carrier based on low-carbon SiMn or SiFeMn with reduced Si content and small fractions of accompanying elements is optionally used. In SiMn production, the liquid SiMn is poured onto lime (CaO) and manganese ore and/or iron ore and optionally onto scrap metal, or the aforementioned charges are introduced into the stream of molten SiMn metal. The scrap metal can optionally be used to cool the melt.

The heat for melting the lime and the iron ore is produced by silicon-thermal reduction of the iron- or manganese-oxides under formation of $SiO_2$. The ratio of silicon to manganese is advantageously adjusted so that in the production of the melt, no further adjustment of the silicon content or the manganese content is required after melting, for example by alloying or slag adjustment.

The novel products produced in this manner is particularly suited for the production of melts according to the invention for steels having low carbon content.

After treatment is concluded, i.e., after deslagging, alloying with aluminum is performed either in the same vessel or in a separate vessel, wherein the aluminum is added in solid or liquid form, whereby—if necessary—the temperature of the melt can also be influenced.

When using only a single vessel for the production of the melt, this vessel may be, for example, an electric arc furnace with adequate heating power. By eliminating transfer into other vessels, particularly short processing times and hence also low processing costs are realized.

When using silicon-containing charges in combination with manganese ore or a combination of iron/manganese ores, heat which may be used for melting the charges is introduced into the melt through the exothermic silicon-thermal reaction between the silicon in the melt and the metal oxides, iron oxide and manganese oxide to $SiO_2$ and iron/manganese.

Melting then occurs faster in the heatable vessel or the metal ore can be added in an unheated second vessel, which may reduce the time taken up in the heated vessel.

In the latter case, beginning with a starting melt, manganese carriers with a suitable carbon content and high Si-content, such as SiMn, are melted. The melt is then transferred to an unheated pan or to a pan heated with a low heating power, and Mn ore is added for reducing the Si under silicon-thermal reaction (introduction of heat). Simultaneously, Mn-carriers and basic slag formers (e.g., CaO) are introduced into the melt for reducing the Mn content in the slag and for adjusting the Si content in the melt.

This is a particular advantage of the invention, for example in the production of steel where a low C content of e.g. <0.3% is required, because vacuum decarburization (VOD—Vacuum Oxygen Degassing) can typically be eliminated. However, if necessary, a particularly low decarburization can be attained later with the VOD process, whereby vacuum treatment is advantageously performed by bottom purging with oxygen.

The formation of CO and hence decarburization is supported by maintaining the relatively acidic (higher $SiO_2$ and MnO contents, lower CaO content) and oxidizing slag during the subsequent vacuum treatment. The basicity of the slag is increased through addition of CaO, and the MnO content of the melt is reduced only after decarburization, which further improves the Mn yield. If necessary, the remaining reduction of the Si concentration can be accomplished through addition of Fe ore and CaO to the slag.

The exemplary production of the melts with different process routes will be described in the following:

Exemplary Route 1:

Production of a melt in an electric arc furnace. The goal is to produce a steel melt with 18% Mn, 0.8% C and 2.3% Si. The production starts with 100 tons of a low-alloy steel melt with Fe>99%, C=0.1%, Si=1%, and Mn=0.25%, to which a charge of 5 tons of a slag with the following composition is added: CaO=39%, $SiO_2$=45%, FeO=10%, $Fe_2O_3$=0.1%, MnO=2%, $MnO_2$=0.01%, MgO=2%, $Al_2O_3$=2%.

To adjust the manganese content, 16 tons of silicon-manganese (SiMn) with the carbon content of 1.7%, 10 tons of ferro-manganese (FeMn) with a carbon content of 7% C, and one ton lime (CaO) are introduced into the molten bath at the start of the process. While the alloy element carriers are introduced, the bath is heated from time to time with the arc.

In the aforedescribed case, the alloy elements are added during about seven minutes, with the arc heating effective during alloying for approximately 5 minutes.

One obtains about 120 tons of melt with a composition of the target alloy, as well as 27 tons slag with a composition of approximately 48% CaO, 38% $SiO_2$, and 7% MnO and other components.

The production time, from the liquid unalloyed steel melt to decanting, can be less than 10 minutes with this process route.

Exemplary Route 2:

Production of a melt with reduced silicon and carbon content in an electric arc furnace and a pan.

The particularity of the route described hereinafter is that no vacuum treatment takes place in the production of an alloy with low carbon content, in spite of the use of relatively low-cost raw materials, and that, by using the silicon-thermal reaction with a short residence time in the arc furnace, a substantial portion of the alloying work takes place in an unheated pan.

The goal is to produce a steel melt with 18% Mn, 0.1% C and 1.3% Si. The production starts with 100 tons of a low-alloy steel melt with Fe>99%, C=0.1%, Si=1%, and Mn=0.25%, to which a charge of 5 tons of a slag with the following composition is added: CaO=39%, $SiO_2$=45%, FeO=10%, $Fe_2O_3$=0.1%, MnO=2%, $MnO_2$=0.01%, MgO=2%, $Al_2O_3$=2%.

At the start of the process, 20 tons of silicon-manganese (SiMn) with the carbon content of 0.3% are introduced into the molten bath within a time interval of approximately 7 minutes. Thereafter, the melt is heated with an arc before being transferred from the arc furnace into a pan. In the pan, 18 tons of manganese ore and 12 tons of CaO are added.

In spite of the large quantity of added components to be melted, the temperature of the melt initially decreases only slightly due to the silicon-thermal reaction and even increases afterwards above the initial temperature. The silicon-thermal reaction is advantaged by the selection of a basic slag composition. This results in approximately 120 tons of melt with the composition of the target alloy and the remainder iron, as well as 33 tons of slag with a composition of approximately, among others, 41% CaO, 35% $SiO_2$, and 20% MnO.

The silicon content in the melt is further reduced by adding more CaO and manganese ore. The addition of CaO alone increases the manganese yield, while Si functions as a reducing agent.

The treatment time of the melt in the arc furnace with this process route is somewhat shorter than 10 minutes, the time in the pan is approximately 25 minutes.

The invention claimed is:

1. A method for producing a steel melt comprising up to 30% Mn content, and up to 5% Si, up to 1.5% C, up to 22% Al, up to 25% Cr, up to 30% Ni, as well as up to 5% of each of Ti, V, Nb, Cu, Sn, Zr, Mo and W, as well as up to 1% of each of N and P, with balance iron as well as unavoidable steel-accompanying elements, with the steps of:

providing and using a heatable vessel with a heating power of more than 200 kW per ton of produced melt or a Biot-number smaller than three, charging the heatable vessel with a charge selected from a liquid iron melt or substitute materials carrying solid iron or a combination of liquid iron melt and substitute materials carrying solid iron, adding a portion or a total quantity of basic slag formers consisting essentially of CaO, MgO or corresponding dolomites, wherein composition and quantity of the slag formers is defined based on a required Si content and Si/Mn ratio, adding a portion or a total quantity of alloy element carriers containing at least one of Mn and Si, heating and melting the alloy element carriers after or during charging, reducing a produced slag quantity through addition of SiMn or SiFeMn containing less than 10% Si, wherein heat for melting the basic slag formers and the charge is produced by silicon-thermal reduction of iron- or manganese-oxides under formation of $SiO_2$, adding silicon-containing charge materials in combination with manganese ore or combined iron/manganese ores, adjusting slag viscosity through addition of flux agents containing at least one of $Al_2O_3$, $SiO_2$ and $CaF_2$, removing the slag and alloying the steel melt with aluminum to a desired Al content.

2. The method of claim 1, further comprising the step of melting the solid iron carriers to a low-alloyed steel melt with a slag, before adding the alloy element carriers containing Mn and/or Si.

3. The method of claim 1, further comprising the step of adding additional alloy element carriers, after adding the alloy element carriers containing Mn and/or Si.

4. The method of claim 1, wherein the alloy element carriers are heated and melted together with the iron carriers in the charge and the slag farmers or in the melt of the previously melted components.

5. The method of claim 1, wherein adding the silicon-containing charge materials includes concurrent or subsequent heating and subsequent addition of the manganese ore or combined iron/manganese ores.

6. The method of claim 1, wherein the heatable vessel is an electric arc furnace.

7. The method of claim 1, wherein charging the heatable vessel, adding slag formers and adding alloy element carriers takes place in the heatable vessel, and wherein the heated and melted alloy element carrier is transferred to a second vessel for alloying with manganese.

8. The method of claim 7, wherein the second vessel is heated.

9. The method of claim 1, wherein the liquid iron melt contains more than 95% iron.

10. The method of claim 1, wherein the substitute materials carrying solid iron comprises scrap metal or direct-reduced iron, or both.

11. The method of claim 1, wherein the melt is maintained slightly above the liquidus temperature of a respective alloy composition, with the alloy composition varying as a function of time.

12. The method of claim 1, wherein the total quantity of slag formers and alloy element carriers are added in a single step, or in several steps having a mutual time offset therebetween.

13. The method of claim 12, wherein the remaining fraction of slag formers and alloy element carriers are added by at least one of deposition onto the slag, injection into the slag, introduction in form of pellets, and introduction in form of a pourable material.

14. The method of claim 1, further comprising the step of, subsequent to alloying with aluminum, vacuum-treating the melt for adjusting C content.

15. The method of claim 14, wherein the vacuum treatment is performed by vacuum oxygen decarburization (VOD).

16. The method of claim 14, wherein acidity of the slag is maintained during the vacuum treatment.

17. The method of claim 1, wherein manganese is added in form of SiMn, in form of FeMn, or in form of metallic Mn.

18. The method of claim 1, further comprising the step of adding at least one of limestone, $CaCO_3$ and $Ca(OH)_2$.

* * * * *